United States Patent
Sharma et al.

(10) Patent No.: US 11,736,907 B2
(45) Date of Patent: Aug. 22, 2023

(54) TERMINAL DEVICE, INFRASTRUCTURE EQUIPMENT AND METHODS FOR RECEIVING WARNING NOTIFICATION MESSAGE

(71) Applicant: Sony Group Corporation, Tokyo (JP)

(72) Inventors: Vivek Sharma, Basingstoke (GB); Brian Alexander Martin, Basingstoke (GB); Shinichiro Tsuda, Basingstoke (GB); Hideji Wakabayashi, Basingstoke (GB); Shin Horng Wong, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/693,976

(22) Filed: Mar. 14, 2022

(65) Prior Publication Data

US 2022/0201438 A1   Jun. 23, 2022

Related U.S. Application Data

(63) Continuation of application No. 16/623,399, filed as application No. PCT/EP2018/065798 on Jun. 14, 2018, now Pat. No. 11,277,713.

(30) Foreign Application Priority Data

Jun. 23, 2017   (EP) ..................................... 17177683

(51) Int. Cl.
   *H04W 4/06*      (2009.01)
   *H04W 4/90*      (2018.01)
   *H04H 20/59*    (2008.01)
   *H04W 72/30*    (2023.01)
   *H04L 12/18*    (2006.01)

(52) U.S. Cl.
   CPC .............. *H04W 4/06* (2013.01); *H04H 20/59* (2013.01); *H04W 4/90* (2018.02); *H04W 72/30* (2023.01);

(Continued)

(58) Field of Classification Search
CPC ....... H04W 76/50; H04W 76/40; H04W 4/90; H04W 4/06; H04M 3/00; H04M 3/5116; H04L 65/4069
See application file for complete search history.

(56) References Cited

U.S. PATENT DOCUMENTS

| | | | | |
|---|---|---|---|---|
| 2007/0124395 | A1* | 5/2007 | Edge ..................... | H04H 60/50 709/206 |
| 2007/0173269 | A1 | 7/2007 | Laroia et al. | |

(Continued)

FOREIGN PATENT DOCUMENTS

| | | |
|---|---|---|
| KR | 1020140022712 A | 2/2014 |
| WO | 2016/043567 A1 | 3/2016 |

OTHER PUBLICATIONS

International Search Report and Written Opinion dated Sep. 20, 2018 for PCT/EP2018/065798 filed on Jun. 14, 2018, 15 pages.

(Continued)

*Primary Examiner* — Joshua L Schwartz
(74) *Attorney, Agent, or Firm* — Xsensus LLP

(57) ABSTRACT

A terminal device for use in a wireless telecommunications network, the terminal device comprising receiver circuitry and control circuitry, wherein the control circuitry is configured to: control the receiver circuitry to receive a first signal indicating that a warning notification message is to be transmitted by infrastructure equipment of the network using a multicast or broadcast transmission; in response to the reception of the first signal, control the receiver circuitry to receive a second signal transmitted by infrastructure equipment of the network using predetermined communication resources, the second signal comprising information for the terminal device to use to determine communication resources for the multicast or broadcast transmission of the warning notification message; determine the communication resources for the multicast or broadcast transmission of the (Continued)

warning notification message using the information comprised in the second signal; control the receiver circuitry to receive the warning notification message using the determined communication resources.

20 Claims, 4 Drawing Sheets

(52) U.S. Cl.
 CPC ........ *H04L 12/189* (2013.01); *H04L 12/1895* (2013.01)

(56) References Cited

U.S. PATENT DOCUMENTS

2014/0134970 A1* 5/2014 Pazos .................. H04L 65/4069
455/404.1

2016/0127439 A1 5/2016 Ginnela et al.

OTHER PUBLICATIONS

Holma, H., and Toskala, A., "LTE for UMTS—OFDMA and SC-FDMA Based Radio Access," System Architecture Based on 3GPP SAE, Wiley, 2009, ISBN 978-0-470-99401-6, 11 pages.

3GPP, "Public Warning System in NR," Ericsson, 3GPP TSG-RAN WG2 No. 98, Tdoc R2-1704354, Hangzhou, China, May 15-19, 2017, 2 pages.

3GPP, "3rd Generation Partnership Project; Technical Specification Group Services and System Aspects; Feasibility Study on Enhancements of Public Warning System; Stage 1," Release 15, 3GPP TR 22.969 V1.0.0, May 2017, 21 pages.

* cited by examiner

US 11,736,907 B2

TERMINAL DEVICE, INFRASTRUCTURE EQUIPMENT AND METHODS FOR RECEIVING WARNING NOTIFICATION MESSAGE

CROSS-REFERENCE TO RELATED APPLICATIONS

This application is a continuation of U.S. application Ser. No. 16/623,399, filed Dec. 17, 2019, which is based on PCT filing PCT/EP2018/065798, filed Jun. 14, 2018, which claims priority to EP 17177683.4, filed Jun. 23, 2017, the entire contents of each are incorporated herein by reference.

BACKGROUND

Field of Disclosure

The present disclosure relates to a terminal device, infrastructure equipment and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Modern wireless communications systems, such as those based on the third generation partnership project (3GPP) defined UMTS, Long Term Evolution (LTE) and New Radio (NR, also known as $5^{th}$ Generation (5G)) architecture are able to support sophisticated services such as instant messaging and video calls, as well as high speed internet access. For example, with the improved radio interface and enhanced data rates provided by such systems, a user is able to enjoy high data rate applications such as mobile video streaming and mobile video conferencing that would previously only have been available via a fixed line data connection.

A further use of such systems, however, relates to the transmission of important public messages such as warning or safety messages (these may be referred to generally as warning notification messages) to terminal devices (such as mobile phones, smartphones, tablet computers and the like) of users. It is desirable for such important public messages to be able to be transmitted to all appropriate terminal devices, even if there is significant network congestion. For this reason, dedicated communication resources (such as radio resources in a time/frequency radio frame) may be used for the transmission of such messages, and the messages may be broadcast using these dedicated communication resources. For example, it is known to transmit Public Warning Services (PWS) messages (a type of warning notification message for alerting people of natural disasters such as earthquakes or tsunamis) using a System Information Block (SIB) so that the PWS can be broadcast to all terminal devices within a particular geographical area.

It is desirable to extend the use of warning notification messages. In particular, it is desirable to allow warning notification messages containing different types of content (for example, audio, images, video or control instructions) to be transmitted to terminal devices in a reliable and efficient manner.

SUMMARY OF THE DISCLOSURE

Respective aspects and features of the present disclosure are defined in the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
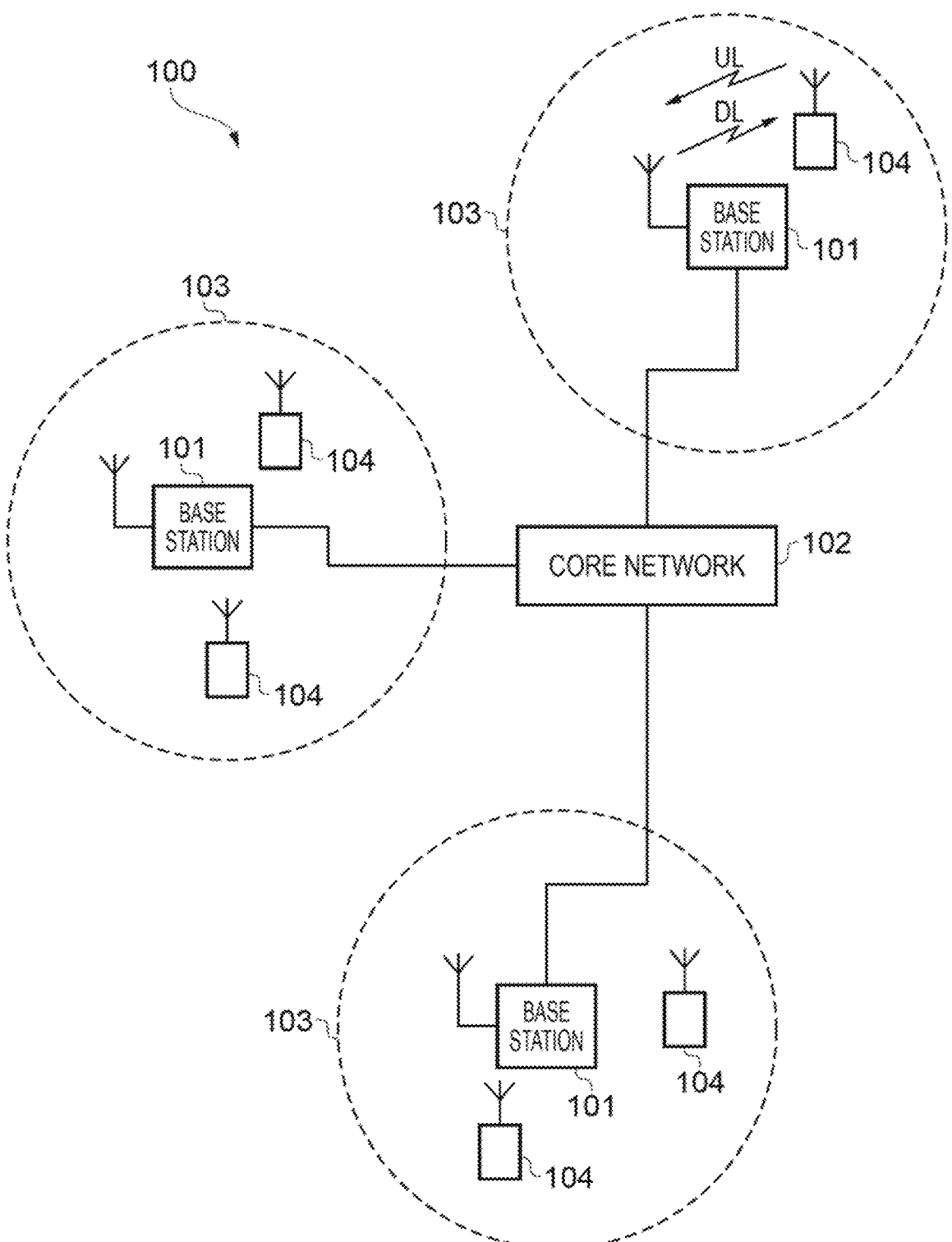
FIG. 1 is a schematic block diagram illustrating an example of a mobile telecommunication system.

FIG. 1 provides a schematic diagram illustrating some basic functionality of a mobile telecommunications network/system operating in accordance with LTE principles and which may be adapted to implement embodiments of the disclosure as described further below. It will be appreciated, however, that the use of LTE is only an example, and that the principles of the present disclosure may be applied to other types of wireless communications systems such as UMTS or NR (5G). Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink. Data is transmitted from communications devices 104 to the base stations 101 via a radio uplink. The uplink and downlink communications are made using radio resources that are licensed for exclusive use by the operator of the network 100. The core network 102 routes data to and from the communications devices 104 via the respective base stations 101 and provides functions such as authentication, mobility management, charging and so on. A communications device may also be referred to as a mobile station, user equipment (UE), user device, mobile radio, terminal device and so forth. A base stations may also be referred to as a transceiver station, infrastructure equipment, NodeB, eNodeB (eNB for short), gNodeB, and so forth.

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

Figure 2:
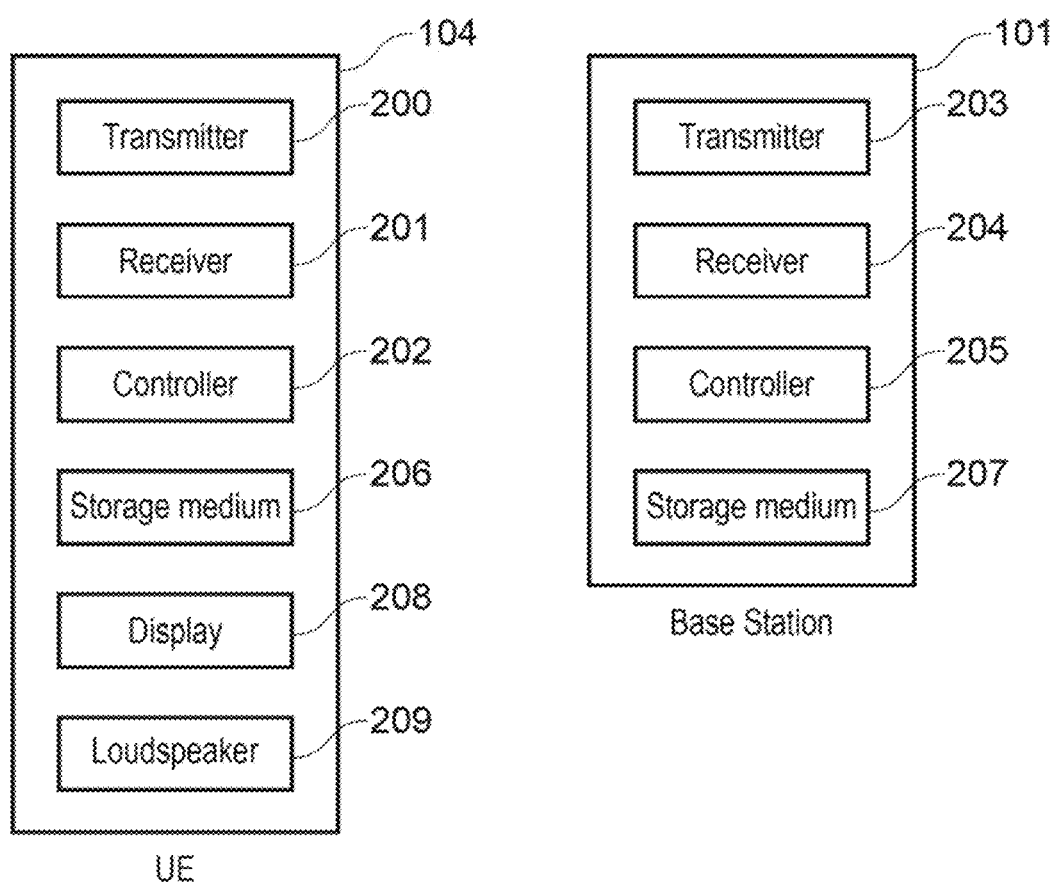
FIG. 2 schematically shows some components of a terminal device and a base station according to an example embodiment.

FIG. 2 schematically shows some components of a UE 104 and a base station 101 according to an example embodiment.

The UE 104 comprises a transmitter 200, a receiver 201, a controller 202, a storage medium 206 (such as, for example, an optical disk, a magnetic disk, semiconductor memory or the like), a display 208 (such as a liquid crystal display (LCD) or the like) and an audio output 209 (in this case, a loudspeaker, although it will be appreciated that the audio output may comprise an interface for connection of personal headphones or the like)). The transmitter 200 is for transmission of wireless signals, the receiver 201 is for reception of wireless signals, the storage medium 206 is for storage of data, the display 208 is for display of information (such as text, images, video or the like) to a user of the UE 104, the audio output 208 is for output of audio signals to a user of the UE 104, and the controller 202 is configured to control the UE 104 to operate in accordance with embodiments of the present disclosure as described herein. The controller 202 may comprise various sub-units for providing functionality in accordance with embodiments of the present disclosure as explained further below. These sub-units may be implemented as discrete hardware elements or as appropriately configured functions of the controller 202. The controller 202 may be suitably configured/programmed to provide the desired functionality described herein using conventional programming/configuration techniques for equipment in telecommunications systems. The transmitter 200, receiver 201 and controller 201 are schematically shown in FIG. 2 as separate elements for ease of representation. However, it will be appreciated that the functionality of these elements can be provided in various different ways, for example using a single suitably programmed general purpose computer, or suitably configured application-specific integrated circuit(s)/circuitry. It will be appreciated that, although not shown, the UE 104 will in general comprise various other elements associated with its operating functionality, such as a user interface and the like. In the following embodiments, the transmitter 200, receiver 201 and controller 202 are implemented as circuitry.

The base station 101 comprises a transmitter 203, a receiver 204, a controller 205 and a storage medium 207 (such as, for example, an optical disk, a magnetic disk, semiconductor memory or the like). The transmitter 203 is for transmission of wireless signals, the receiver 204 is for reception of wireless signals, the storage medium 207 is for storage of data, and the controller 205 is configured to control the base station 101 to operate in accordance with embodiments of the present disclosure as described herein. The controller 205 may comprise various sub-units for providing functionality in accordance with embodiments of the present disclosure as explained further below. These sub-units may be implemented as discrete hardware elements or as appropriately configured functions of the controller 205. The controller 205 may be suitably configured/programmed to provide the desired functionality described herein using conventional programming/configuration techniques for equipment in telecommunications systems. The transmitter 203, receiver 204 and controller 205 are schematically shown in FIG. 2 as separate elements for ease of representation. However, it will be appreciated that the functionality of these elements can be provided in various different ways, for example using a single suitably programmed general purpose computer, or suitably configured application-specific integrated circuit(s)/circuitry. In the following embodiments, the transmitter 203, receiver 204 and controller 205 are implemented as circuitry.

As discussed above, wireless communication systems such as that described with reference to FIGS. 1 and 2 allow warning notification messages to be transmitted to terminal devices 104 from the base station 205. However, there is a desire to extend the use of warning notification messages. In particular, it is desirable to allow warning notification messages containing different types of content (for example, audio, images, video or control instructions) to be transmitted to terminal devices in a reliable and efficient manner.

The use of warning notification messages containing content other than text has recently been considered in [2]. This document describes potential new use cases and requirements applicable to warning notification messages, in particular, Public Warning Services (PWS) messages. In the following description, PWS messages will be referred to. However, it will be appreciated that the present technique is applicable to any type of warning notification message.

Document [2] considers the need for PWS messages for use with UEs with diverse form-factors whose user interface is different from the conventional mobile phones and UEs that are defined by applying a 3GPP system to non-ICT industry businesses (e.g. vehicles or machines such as IoT devices or robots) and which have a different UE role from what 3GPP has traditionally assumed. In addition, it considers the improvement of the comprehension of PWS messages. For example, the PWS message may display language independent or graphical content to users. This is useful for those who might not understand the language used in a textual PWS message (such as people visiting a foreign country where they do not understand the native language) or people with a physical disability who may be sight impaired and unable to read the text. Document [2] discusses user interface-related potential requirements to address the presentation of the warning message considering circumstances such as language being used (for example, international roaming scenario where the user does not understand the local language) or users with disability (for example, people with vision impairment).

A problem associated with different formats of warning notification message (that is, notification warning messages in a non-text format such as notification messages comprising audio, images, video or control instructions) is that a larger amount of data may be required for such messages. This larger amount of data means that the usual methods for transmission of warning notification messages (such as inclusion in a System Information Block (SIB), in the case of PWS messages) may not be applicable (because they do not contain enough capacity for the increased data amount—for example. Radio Resource Control (RRC) messages have a maximum message size of 2216 bits, and this may not be enough for alternative format warning notification messages). A way of transmitting such alternative format warning notification messages in a reliable and efficient manner is therefore required.

Embodiments of the present technique allow delivery of new formats of warning notification messages using a multicast transmission technique such as MBMS (Multimedia Broadcast Multicast Service) or SC-PTM (Single-Cell Point-to-Multipoint). New formats of PWS messages are proposed in embodiments. These formats cover Access Stratum (AS) layer changes only. This mean that enhancements to delivery of different format PWS messages from protocol stacks to display units in the UEs and delivery to a 3GPP node from other network entities outside the scope of 3GPP need not be considered. Furthermore, in embodiments, a multicast service such as MBMS or SC-PTM is enhanced to carry new formats of warning notification messages via an over the air interface. This allows existing MBMS/SC-PTM architecture to be used between different layers of the UE or between different 3GPP defined network entities.

Current MBMS transmission in LTE includes the following steps:

1. The UE 104 monitors if SIB (System Information Block) 13 is scheduled.
2. SIB 13 indicates the MCCH (Multicast Control Channel) configuration.
3. The MCCH provides the MTCH (Multicast Traffic Channel) configuration. Information transmitted using MBMS is transmitted using communication resources (in particular, radio resources defined in a time/frequency radio frame) of the MTCH.
4. UE 104 monitors the PDCCH (Physical Downlink Control Channel) notification indication for a change in the MCCH configuration.

It is noted that SC-PTM follows a similar approach. The difference is that that SC-PTM is scheduled using the PDSCH (Physical Downlink Shared Channel)/PDCCH instead of the PMCH (Physical Multicast Channel) (as used for MBMS).

Current warning notification message transmission (in particular. PWS message transmission) includes the following steps:

1. The UE 104 receives paging with an indication that a PWS transmission is to occur
2. The UE 104 reads SIB1 for scheduling info for SIB 10, 11 or 12 (the PWS being comprised within SIB 10, 11 or 12).

The present technique recognises that, by using a multicast transmission technique such as MBMS or SC-PTM rather than a SIB, a warning notification message (such as a PWS message) comprising a larger amount of data may be transmitted. This allows, for example, warning notification messages comprising non-textual data such as audio, images, video or control instructions (for example) to be transmitted in a reliable and efficient manner.

An embodiment of the present technique provides a terminal device 104 for use in a wireless telecommunications network 100. The terminal device 100 comprises receiver circuitry 201 and control circuitry 202.

The control circuitry 202 is configured to control the receiver circuitry 201 to receive a first signal indicating that a warning notification message is to be transmitted by infrastructure equipment 101 of the network using a multicast transmission. In an embodiment, the first signal is comprised within a paging message. In another embodiment, the first signal is transmitted using communication resources of a control channel for scheduling communication resources for transmission of data from infrastructure equipment 101 of the network to the terminal device 104. The control channel may be the PDCCH, for example. The use of PDCCH instead of paging for PWS notification is discussed in [3], for example.

In response to the reception of the first signal, the control circuitry 202 is configured to control the receiver circuitry 201 to receive a second signal transmitted by infrastructure equipment 101 of the network using predetermined communication resources. The second signal may be comprised within a SIB (such as SIB1), for example. In this case, the predetermined communication resources will be communication resources of the SIB. The second signal comprises information for the terminal device to use to determine communication resources for the multicast transmission of the warning notification message. The control circuitry 202 is configured to determine the communication resources for the multicast transmission of the warning notification message using the information comprised in the second signal and to control the receiver circuitry 201 to receive the warning notification message using the determined communication resources.

In an embodiment, the second signal schedules the communication resources for multicast transmission of the warning notification message. For example, if MBMS is used for the multicast transmission and the second signal is comprised within a SIB, then the SIB will directly indicate subframes and an RNTI (Radio Network Temporary Identifier) to monitor (for MTCH). In other words, MTCH resources are not indicated in MCCH but in the SIB, and the UE 104 receives the warning notification message over MTCH (PDCCH/PDSCH).

In another embodiment, the second signal schedules a configuration of a control channel for scheduling the communication resources for multicast transmission of the warning notification message. For example, if MBMS is used for the multicast transmission and the second signal is comprised within a SIB, then the UE 104 will read the SIB for scheduling information for the MCCH configuration. The SIB (or a new SIB) then provides the MCCH configuration and the MCCH provides the MTCH configuration, thus allowing the UE 104 to receive the warning notification message over MTCH (PDCCH/PDSCH).

It is noted that by using the above described technique (in particular, the use of the first signal to indicate that a warning notification message is to be transmitted), further problems such as MBMS having a latency or being in an always-on configuration are alleviated.

As well as the desire to provide warning notification messages with non-textual content, it is also desirable to be able to transmit different warning notification messages to different terminal devices so that those different terminal devices can respond to a situation warranting the transmission of a warning notification message (such as an earthquake or tsunami) in different ways. With the present technique, the term "terminal device" should be understood to mean any device which is able to receive a warning notification message and to perform a function in response to the receipt of that warning notification message. For example, as well as conventional terminal devices such as mobile phones or the like, terminal devices may also include home appliances such as kitchen appliances or air conditioning units. In one example, in response to an emergency situation in which warning notification messages are transmitted, it may be desirable for one type of terminal device (for example, a mobile phone) to provide an audio and/or visual alert to a user in response to receiving a warning notification message whilst another type of terminal device (for example, an air conditioning unit) turns itself off in response to receiving a warning notification message (thus helping to prevent damage to the device or situations such as an electrical fire from arising).

Thus, in an embodiment, different types of terminal devices (that is, terminal devices which are intended to respond in different ways in response to transmitted warning notification messages) may be grouped together (so that all terminal devices of a particular type are grouped in the same group). Each of these groups is associated with a different respective group identifier (such as a Group RNTI, for example). A plurality of different warning notification messages is then transmitted.

Each of the plurality of warning notification messages is associated with a different respective one of the groups of terminal devices and is transmitted using a different respective set of communication resources. Each set of communication resources is associated with the group identifier of the group for which a warning notification message is transmitted using that set of communication resources in such a way that the set of communication resources for each group may be identified and/or accessed by terminal devices within that group. Thus, for example, if a first set of communication resources is used for transmission of the warning notification message for a first group of terminal devices, then the first set of communication resources is associated with the group identifier of that first group. Similarly, if a second set of communication resources is used for transmission of the warning notification message for a second group of terminal devices, then the second set of communication resources is associated with the group identifier of that second group, and so on. In one example, the group identifier associated with a set of communication resources is explicitly indicated in one or more of the communication resources of that set. Alternatively, the group identifier may be explicitly indicated in scheduling information for that set of communication resources. In another example, the information (including the warning notification message) transmitted using each set of communication resources is scrambled based on the group identifier associated with that set (for example, using the group identifier as a hash). Again, alternatively, it may be scheduling information of that set of communication resources which is scrambled based on the group identifier. It will be appreciated that other methods of associating each set of communication resources its respective group identifier may also be used.

For each terminal device 104, the control circuitry 202 is configured to determine the communication resources for the multicast transmission of the warning notification message for that group based on the group identifier of the group of terminal devices to which that terminal device 104 belongs. For example, in the case that the group identifier associated with a set of communication resources is explicitly indicated in one or more of the communication resources of that set, the control circuitry 202 reads the information transmitted using the set of communication resources for which the group identifier of the group within which the terminal device 104 is comprised is explicitly indicated. In the case that the group identifier is explicitly indicated in scheduling information for that set of communication resources, the control circuitry 202 reads the scheduling information for which the group identifier of the group within which the terminal device is comprised is explicitly located, thus allowing the appropriate set of communication resources to be identified. Alternatively, in another example, in the case that the information (including the warning notification message) transmitted using each set of communication resources is scrambled using the group identifier associated with that set (for example, using the group identifier as a hash), the control circuitry 202 attempts to descramble the information transmitted using each set of communication resources. The terminal device 104 will only be able to successfully descramble the information transmitted using the set of communication resources associated with the group identifier of the group within which the terminal device 104 is comprised. In the case that the scheduling information is scrambled based on the group identifier, the terminal device 104 will only be able to successfully descramble the scheduling information scrambled using the group identifier of the group within which the terminal device 104 is comprised. In each of these examples, the group identifier may be stored in the storage medium 206 of the terminal device 104, for example, thus allowing the control circuitry 202 to use the stored group identifier in matching explicitly indicated group identifiers of communication resources or scheduling information or in descrambling communication resources or scheduling information.

The UE 104 may take different actions depending on its RRC (Radio Resource Control) state (RRC_idle or RRC_Connected) and further based on a service or slice it is accessing at the time of reception of a warning notification message. In an embodiment, the grouping mechanism takes these factors (that is, RRC state and/or service/slice information) into account. For example, an RRC_Idle UE (that is, a UE 104 in an idle state) may receive a common warning notification message (without taking into account grouping or the common warning notification message being addressed to a common group), whereas an RRC_Connected UE (that is, a UE 104 in a connected state) and/or a UE connected to a specific slice takes a different action. For example, when a UE is machine comprising sprinklers on a factor floor, the UE may activate the sprinklers if it is accessing a public safety slice in the case that a fire warning notification message generated locally at a base station is broadcast by the base station. On the other hand, idle mode UEs may display instructions to the nearest exit based on their location (location based grouping) or may be instructed to power down (this latter case being suitable, for example, for machines on the factory floor which should be shut down for safety and/or damage limitation reasons in the case of fire). Other UEs (such as factory machines) having an RRC_Connected session may also be ordered to shut down.

In an embodiment, each of the plurality of warning notification messages is transmitted using communication resources associated with a different respective multicast service (such as a different MBMS or SC-PTM service). The communication resources associated with each multicast service are scheduled based on the group identifier of the group of terminal devices associated with the warning notification message transmitted using that multicast service. In one example, different warning notification messages (such as different PWS messages) are mapped to different MBMS services so as to allow the different messages to be broadcast to different groups. Each different warning notification message is scheduled with service specific RNTI (in this case, the service specific RNTI acts as the group identifier). Different warning notification messages (such as different PWS messages) may also be mapped to different SC-PTM services using a group RNTI (in this case, the group RNTI acts as the group identifier). In either case, the scheduling information may, for example, explicitly comprise the relevant RNTI or may be scrambled using the relevant RNTI, as previously discussed.

In another embodiment, each of the plurality of warning notification messages is transmitted as a different respective command using communication resources associated with a single multicast service (for example, a single MBMS or SC-PTM service). Each command is associated with the group identifier of the group of terminal devices associated with the warning notification message transmitted as that command. The control circuitry 202 is configured to parse the commands received by the receiver circuitry 201 so as to determine the command associated with the group identifier of the group of terminal devices comprising the terminal device 104. Transmitting each warning notification message as a different respective command using communication resources of a single multicast service alleviates delays that may occur and reduces communication resource usage compared to the case in which communication resources of multiple multicast services are used. Thus reduction in communication resource usage allows the unused communication resources to be used for repetition of the warning notification message, for example, thus improving the reliability with which the warning notification message is transmitted to terminal devices. In an example, the commands transmitted via a single multicast service are ATtention (AT) commands. The control circuitry 202 of the terminal device 104 then implements a parsing function in order to detect the correct AT command. In this case, each command may, for example, explicitly comprise the relevant group identifier or may be scrambled using the relevant group identifier (the relevant group identifier being, for example, a group RNTI).

In an embodiment, the first signal (in the form of a paging message or signal transmitted using the PDCCH, for example) is transmitted only to terminal devices within a group to which a warning notification message is to be sent. The first signal may, for example, explicitly comprise the group identifier of the relevant group or may be scrambled based on the group identifier of the relevant group (thus allowing only terminal devices within the relevant group to determine information comprised within the first signal).

Thus, with the present technique, different warning notification messages may be transmitted to different groups of terminal devices based on the function of those terminal devices. For example, a first notification warning message may be transmitted to a group of mobile phones in order to cause the mobile phones to display a video or image (using display 208) or to emit an audio signal (using audio output 209) indicative of the warning. In this case, for example, the first warning notification message comprises the video, image or audio information. A second notification warning message may be transmitted to a group of air conditioning units in order to cause the air conditioning units to turn off. In this case, for example, the second warning notification message comprises a control instruction to control the air condition units to turn off. In general, each terminal device in each group which receives a notification warning message for that group may be configured to perform a process based on the received warning notification message, with the terminal devices in different groups performing different respective processes based on the different warning notification messages transmitted to each group. It will be appreciated that although, in the above example, the control instruction instructs the air conditioning units to turn off, the control instruction may be any instruction which controls any electrical appliance which acts as a terminal device to perform a certain function (for example, turn on, switch to a standby mode, and so on). The present technique thus provides an improved variety of warning notification messages whilst ensuring efficient and reliable transmission of those warning notification messages.

As previously discussed, in an embodiment, the first signal transmitted to the terminal device 104 indicating that a warning notification message is to be transmitted is comprised within a paging message. In the case that different groups of terminal devices (UEs) receive different warning notification messages, only UEs in a particular group may be paged at a given time, thus alleviating the need for all UEs to be paged (and therefore woken up) even when the warning notification message is not relevant to some of those UEs.

In an embodiment, there may be two separate mechanisms. For smaller size warning notification messages, these may be comprised within a SIB, as previously explained. For larger size warning notification messages, these may be transmitted using a multicast service (e.g. MBMS or SC-PTM) in accordance with the present technique. Both mechanisms rely on paging the UE. The paging message therefore distinguishes the purpose of the paging and clearly indicates the next step for the UE (for example, in the case that a SIB comprises small size warning notification messages and a SIB comprises the scheduling information (e.g. MCCH configuration for MBMS) for large size warning notification messages, the paging message will indicate which SIB the UE should monitor next). More generally, it can be said that the first signal comprises information which is used by the control circuitry 202 of a receiving UE to determine whether the warning notification message is to be transmitted using a SIB (e.g. SIB 11, 12 or 13, as is the case for smaller size warning notification messages) or transmitted using a mechanism as described above in accordance with the present technique (as is the case for large size warning notification messages). It is noted that, in an embodiment in which each of the plurality of warning notification messages is transmitted as a different respective command, these commands may be transmitted within a SIB (for example, SIB 10, 11 or 12) if they are sufficiently small in size to be comprised within a SIB. Such an arrangement allows such commands to be sent using existing CBC (Cell Broadcast Centre) architecture, thus alleviating the need for adjustment of the existing CBC architecture whilst allowing the transmission of different warning notification messages as different respective commands.

In an embodiment, the warning notification message is a PWS message. PWS architecture uses CBC (Cell Broadcast Centre) which is outside the scope of 3GPP and which connects to a 3GPP network via MME (Mobile Management Entity) or Core network/RNC (Radio Network Controller). CBC currently sends only text warning messages. Thus, where necessary, the architecture for delivery of non-text PWS messages is adjusted so that non-text PWS messages comprising other types of information (e.g. audio, image, video or control instruction Information) can also be delivered to the base station 101. In particular, the allocation of group identifiers to different groups of UEs must be handled. In an embodiment, the CBC (or MBMS-gateway (MBMS-GW)) sends non-text PWS messages and additionally handles the group identifier allocation. The core network and eNB are then group agnostic. However, the CBC may be owned by a Government agency or may interact with a Government agency. Furthermore, the group identifier (group ID) may be specific to different deployments. So, in an embodiment, the group ID may be configured in the subscription profile and passed to the MME during the attach procedure. MME may in turn send a list of group IDs to the eNBs (each eNB 101 storing the list of group IDs in its storage medium 207) which then transmit PWS messages (or, more generally, warning notification messages) using those group IDs in the way as previously described. In an example, eNBs in a factory environment (that is, where UEs receiving the PWS messages are used to control machines in a factory) may store group IDs of different UEs. The group IDs may either be received from the core network or be locally configured or received from UEs in the factory. In general, each group identifier stored in the storage medium 207 of the eNB 101 may be received from a terminal device comprised within the group associated with that group identifier. It will be appreciated that this arrangement may be applied in other environments (that is, not necessarily a factory environment).

In an embodiment, if an eNB 101 receives group identifiers (Group IDs) in the warning notification message from the core network 102 (CN) and the UEs 104 and CN 102 are aware of the Group IDs, then the eNB transmits (via broadcast or multicast, for example) the same warning notification message to the UEs in each identified group over the air. If Group IDs are configured locally or Group IDs are provided by the UEs 104 to the eNB 101, then the eNB operates as follows. If the eNB 101 is informed of the Group ID(s) by the UEs 104, then the UEs 104 inform the eNB 101 (using, for example Radio Resource Control (RRC) signalling) and the eNB 101 thus collects the Group ID(s) corresponding to all the UEs in its coverage. Alternatively, in the case of locally configured Group IDs, the eNB may allocate Group ID(s) to UEs 104 (for example, using RRC dedicated or broadcast signalling).

In an embodiment, as well as each warning notification message being different for each group of UEs, the delivery of those warning notification messages may also be different, depending on their size. For example, if, for a first group, the warning notification message is of a first, larger size, then the warning notification message for that group may be transmitted using a multicast technique (such as MBMS or SC-PTM). On the other hand, for a second group, the warning notification message may be of a second, smaller size. In this case, the warning notification message for that group may be transmitted in a SIB (as long as the size of the warning notification message for that group is small enough to be included in a SIB). The warning notification message may therefore be transmitted in a SIB when it consists of a data amount which is less than a predetermined threshold (the predetermined threshold being a predetermined data amount set such that a warning notification message consisting of a data amount which is less than the predetermined threshold will fit within a SIB). In the case that the warning notification message for a particular UE 104 (or group of UEs associated with a particular group identifier) is sufficiently small to be transmitted in a SIB, the second signal may comprise information for the UE(s) to use to determine SIB communication resources transmission of the warning notification message. The UE(s) are thus able to determine the SIB communication resources for transmission of the warning notification message using the information comprised in the second signal and to receive the warning notification message using the determined SIB communication resources. In this case, the UE(s) may know that the warning notification message is to be transmitted in a SIB because of information in the first signal (for example, a paging message) which indicates that this is the case (as previously discussed). The UEs in a group may determine the SIB communication resources for transmission of the warning notification message to that group based on the group identifier of that group of UEs (again, for example, the information in the second signal may explicitly identify the group identifier or may be scrambled based on the group identifier).

In an embodiment, certain UEs (for example, UEs controlling machines in a factory) may be remote UEs which are not directly connected to the network but which are able to receive signals from the network via a relay UE. In this case, the relay UE relays the warning notification message to the remote UEs. The warning notification message is relayed to the remote UEs unconditionally, that is, it will always be related to the remote UE by the relay UE when the relay UE receives the warning notification message. In an embodiment, the UE 104 may act as a relay UE 104. In this case, the control circuitry 202 controls the transmitter circuitry 200 to transmit the received warning notification message to a further UE (the further UE being configured as described for the UE 104).

In an embodiment relating to vehicle use cases (that is, transport vehicles such as automobiles or the like), the relay UE may be installed at a specific position such as, for example, a lamp post at the road side. The relay UE receives a warning notification message from an eNB (via a UE-to-Network relay mechanism or via a backhaul/optical fibre connection, for example). The control circuitry 202 of the relay UE (or, alternatively, small cell, for example) stores the warning notification message in the storage medium 206 (for example, in order to cache the warning notification message) and the transmitter circuitry 200 repeatedly transmits the stored message until the version of the message is updated (for example, until the warning notification message is cancelled). The storage medium 206 may also store various types of content (for example, audio, images, video or control instructions). This type of relay UE is useful for continuous provision of a warning notification message at a specific location over a time period at which the warning notification message is required (for example, over the time period over which a road or lane is closed).

In an embodiment, the relay UE may be used in an out-of-coverage area (for example, as a standalone relay UE in a UE-to-UE relay mechanism). In this case, the relay UE has the suite of required functions for provision of warning notification messages such as CBE, CBC and MME (in addition to radio functions). For example, if a vehicle has an accident or break down at the side of the road, a driver activates a warning mechanism of a UE (such as a warning mechanism of their mobile phone) which results in the transmission of a warning notification message to the relay UE. The relay UE receives the warning notification message and transmits it to one or more other UEs and/or the network (for example, the relay UE may broadcast the warning notification message). This allows the driver to cause a warning notification message to be transmitted even though the UE they have (for example, their mobile phone) is out-of-coverage of the network. In an embodiment, certain warning notification messages transmitted by a driver in this case may cause predetermined processes to occur in UEs which receive those warning notification message. For example, in the case that a driver is involved in a vehicle breakdown and transmits a warning notification message indicating that the breakdown has occurred, surrounding UEs (such as mobile phones of other drivers or connected road traffic signs) to which the warning message is transmitted may be controlled to display or emit a predetermined alert (such as a predetermined image or audio signal) so as to warn them of the vehicle breakdown. In this case, the predetermined alert (such as a predetermined image or audio signal) may be preinstalled on the surrounding UEs (for example, pre-stored in a storage medium 206 of those surrounding UEs).

In embodiments of the present technique, it is noted that a communication resource is, for example, a radio resource of a time/frequency radio frame (as used in various examples of the 3GPP standards).

Figure 3:
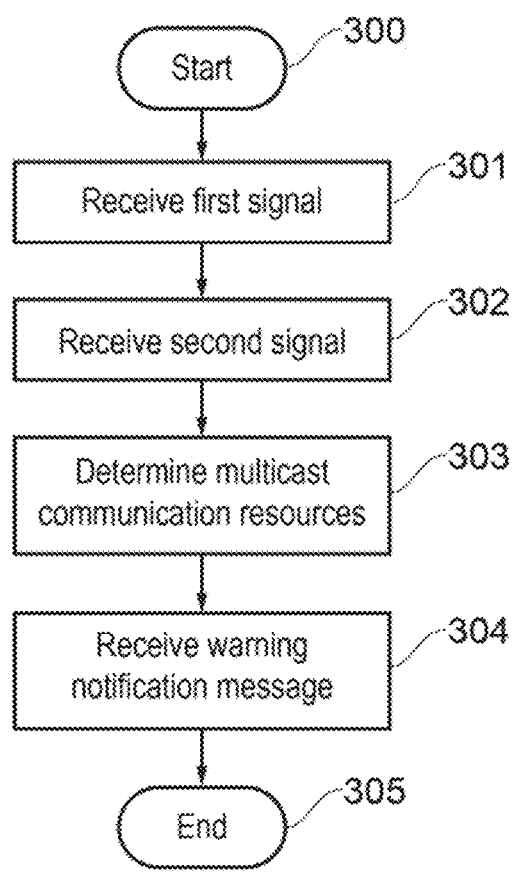
FIG. 3 shows a flow chart showing a process carried out by a terminal device according to an example embodiment.

FIG. 3 shows a flow chart showing a process carried out by the terminal device 104 according to an embodiment of the present technique. The process starts at step 300. At step 301, the receiver circuitry 201 is controlled to receive a first signal indicating that a warning notification message is to be transmitted by infrastructure equipment of the network using a multicast transmission. At step 302, in response to the reception of the first signal, the receiver circuitry 201 is controlled to receive a second signal transmitted by infrastructure equipment of the network using predetermined communication resources, the second signal comprising information for the terminal device to use to determine communication resources for the multicast transmission of the warning notification message. At step 303, the communication resources for the multicast transmission of the warning notification message are determined using the information comprised in the second signal. At step 304, the receiver circuitry 201 is controlled to receive the warning notification message using the determined communication resources. The process ends at step 305.

Figure 4:
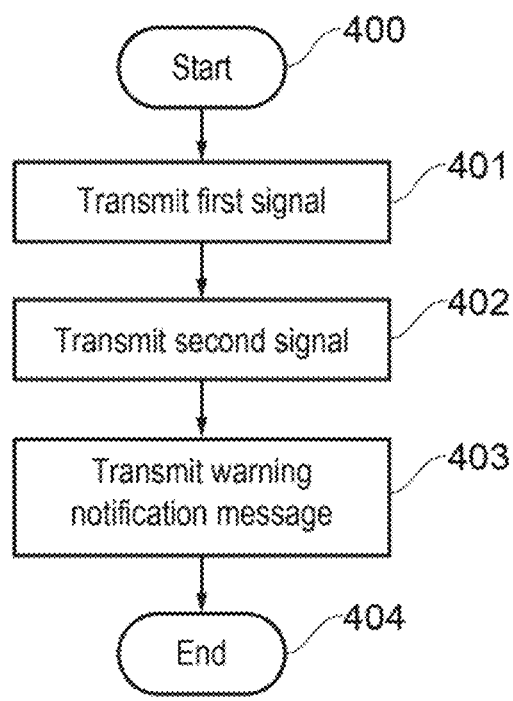
FIG. 4 shows a flow chart showing a process carried out by a base station according to an example embodiment.

FIG. 4 shows a flow chart showing a process carried out by the base station 101 according to an embodiment of the present technique. The process starts at step 400. At step 401, the transmitter circuitry 203 is controlled to transmit a first signal to a terminal device 104 of the network indicating that a warning notification message is to be transmitted to the terminal device 104. At step 402, the transmitter circuitry 203 is controlled to transmit a second signal to the terminal device 104 using predetermined communication resources, the second signal comprising information for the terminal device 104 to use to determine communication resources for the multicast transmission of the warning notification message. At step 403, the transmitter circuitry 203 is controlled to transmit the warning notification message using the communication resources determinable by the terminal device 104 using the information comprised in the second signal.

Although, with the above described embodiments, the communication resources used for transmission of the warning notification message are communication resources for multicast transmission, the communication resources used for transmission of the warning notification message may instead be communication resources for broadcast transmission. In this case, all other details of the embodiments remain the same as described. For example, both MBMS and SC-PTM arrangements allow transmission of data via broadcast or multicast communication resources. Thus, more generally, with the present technique, a first signal indicates that a warning notification message is to be transmitted by infrastructure equipment of the network using a multicast or broadcast transmission. The second signal transmitted by infrastructure equipment of the network using predetermined communication resources comprises information for the terminal device to use to determine communication resources for the multicast or broadcast transmission of the warning notification message. The communication resources for the multicast or broadcast transmission of the warning notification message is determined by a terminal device of the network using the information comprised in the second signal. The terminal device then receives the warning notification message using the determined communication resources (whether those determined communication resources are multicast communication resources or broadcast communication resources).

Thus there has been described a terminal device for use in a wireless telecommunications network, the terminal device comprising receiver circuitry and control circuitry, wherein the control circuitry is configured to: control the receiver circuitry to receive a first signal indicating that a warning notification message is to be transmitted by infrastructure equipment of the network using a multicast or broadcast transmission (i.e. a transmission to a plurality of recipients); in response to the reception of the first signal, control the receiver circuitry to receive a second signal transmitted by infrastructure equipment of the network using predetermined communication resources, the second signal comprising information for the terminal device to use to determine communication resources for the multicast or broadcast transmission of the warning notification message; determine the communication resources for the multicast or broadcast transmission of the warning notification message using the information comprised in the second signal; control the receiver circuitry to receive the warning notification message using the determined communication resources.

Various embodiments of the present technique are described by the following numbered clauses:

1. A terminal device for use in a wireless telecommunications network, the terminal device comprising receiver circuitry and control circuitry, wherein the control circuitry is configured to:
   control the receiver circuitry to receive a first signal indicating that a warning notification message is to be transmitted by infrastructure equipment of the network using a multicast or broadcast transmission;
   in response to the reception of the first signal, control the receiver circuitry to receive a second signal transmitted by infrastructure equipment of the network using predetermined communication resources, the second signal comprising information for the terminal device to use to determine communication resources for the multicast or broadcast transmission of the warning notification message;
   determine the communication resources for the multicast or broadcast transmission of the warning notification message using the information comprised in the second signal;
   control the receiver circuitry to receive the warning notification message using the determined communication resources.

2. A terminal device according to clause 1, wherein the second signal schedules the communication resources for multicast or broadcast transmission of the warning notification message.

3. A terminal device according to clause 1, wherein the second signal schedules a configuration of a control channel for scheduling the communication resources for multicast or broadcast transmission of the warning notification message.

4. A terminal device according to any preceding clause, wherein the first signal is comprised within a paging message.

5. A terminal device according to any one of clauses 1 to 3, wherein the first signal is transmitted using communication resources of a control channel for scheduling communication resources for transmission of data from infrastructure equipment of the network to the terminal device.

6. A terminal device according to any preceding clause, wherein the warning notification message is one of a plurality of warning notification messages, each of the plurality of warning notification messages being associated with a respective group of one or more terminal devices and each group of one or more terminal devices being associated with a respective group identifier, wherein the control circuitry is configured to determine the communication resources for the multicast or broadcast transmission of the warning notification message based on the group identifier of the group of one or more terminal devices comprising the terminal device.

7. A terminal device according to clause 6, wherein each of the plurality of warning notification messages is transmitted using communication resources associated with a different respective multicast or broadcast service, the communication resources associated with each multicast or broadcast service being scheduled based on the group identifier of the group of one or more terminal devices associated with the one of the plurality of warning notification messages transmitted using the communication resources associated with that multicast or broadcast service.

8. A terminal device according to clause 6, wherein each of the plurality of warning notification messages is transmitted as a different respective command using communication resources associated with a single multicast or broadcast service, each command being associated with the group identifier of the group of one or more terminal devices associated with the warning notification message transmitted as that command, wherein the control circuitry is configured to parse the commands received by the receiver circuitry so as to determine the command associated with the group identifier of the group of one or more terminal devices comprising the terminal device.

9. A terminal device according to clause 8, wherein, when one of the plurality of warning notification messages consists of a data amount of less than a predetermined data amount, the one of the plurality of warning notification messages is transmitted using communication resources of a system information block (SIB), and when the one of the plurality of warning notification messages is the warning notification message to be received by the terminal device:
the second signal comprises information for the terminal device to use to determine the SIB communication resources to be used for transmission of the warning notification message, and
the control circuitry is configured to:
determine the SIB communication resources to be used for transmission of the warning notification message using the information comprised in the second signal,
control the receiver circuitry to receive the warning notification message using the determined SIB communication resources.

10. A terminal device according to any one of clauses 6 to 9, comprising, a storage medium configured to store the group identifier of the group of one or more terminal devices comprising the terminal device, wherein the control circuitry is configured to control the transmitter circuitry to transmit the stored group identifier to infrastructure equipment of the network.

11. A terminal device according to any one of clauses 6 to 9, comprising, a storage medium configured to store the group identifier of the group of one or more terminal devices comprising the terminal device, wherein the control circuitry is configured to control the receiver circuitry to receive the group identifier from infrastructure equipment of the network.

12. A terminal device according to any preceding clause, wherein the control circuitry is configured to perform a process based on the received warning notification message.

13. A terminal device according to clause 12, wherein the warning notification message comprises one of audio, image or video information and the process performed by the control circuitry comprises reproduction of the audio, image or video information.

14. A terminal device according to clause 12, wherein the warning notification message comprises a control instruction for controlling a function of the terminal device and the process performed by the control circuitry comprises controlling the terminal device to perform the function.

15. A terminal device according to any preceding clause, wherein the multicast or broadcast transmission is a Multimedia Broadcast Multicast Service (MBMS) or Single-Cell Point-to-Multipoint (SC-PTM) transmission.

16. A terminal device according to any preceding clause, comprising transmitter circuitry configured to transmit the warning notification message to a further terminal device.

17. Infrastructure equipment for use in a wireless telecommunications network, the infrastructure equipment comprising transmitter circuitry and control circuitry, wherein the control circuitry is configured to:
control the transmitter circuitry to transmit a first signal to a terminal device of the network indicating that a warning notification message is to be transmitted to the terminal device;
control the transmitter circuitry to transmit a second signal to the terminal device using predetermined communication resources, the second signal comprising information for the terminal device to use to determine communication resources for the multicast or broadcast transmission of the warning notification message; and
control the transmitter circuitry to transmit the warning notification message using the communication resources determinable by the terminal device using the information comprised in the second signal.

18. Infrastructure equipment according to clause 17, wherein the second signal schedules the communication resources for multicast or broadcast transmission of the warning notification message.

19. Infrastructure equipment according to clause 17, wherein the second signal schedules a configuration of a control channel for scheduling the communication resources for multicast or broadcast transmission of the warning notification message.

20. Infrastructure equipment according to any one of clauses 17 to 19, wherein the first signal is comprised within a paging message.

21. Infrastructure equipment according to any one of clauses 17 to 19, wherein the first signal is transmitted using communication resources of a control channel for scheduling communication resources for transmission of data to the terminal device.

22. Infrastructure equipment according to any one of clauses 17 to 21, wherein the warning notification message is one of a plurality of warning notification messages, each of the plurality of warning notification messages being associated with a respective group of one or more terminal devices and each group of one or more terminal devices being associated with a respective group identifier, wherein the control circuitry is configured to determine the communication resources for the multicast or broadcast transmission of the warning notification message based on the group identifier of the group of one or more terminal devices comprising the terminal device.

23. Infrastructure equipment according to clause 22, wherein each of the plurality of warning notification messages is transmitted using communication resources associated with a different respective multicast or broadcast service, the communication resources associated with each multicast or broadcast service being scheduled based on the group identifier of the group of one or more terminal devices associated with the one of the plurality of warning notification messages transmitted using the communication resources associated with that multicast or broadcast service.

24. Infrastructure equipment according to clause 22, wherein each of the plurality of warning notification messages is transmitted as a different respective command using communication resources associated with a single multicast or broadcast service, each command being associated with the group identifier of the group of one or more terminal devices associated with the warning notification message transmitted as that command, wherein the terminal device is configured to parse the commands received by the receiver circuitry so as to determine the command associated with the group identifier of the group of one or more terminal devices comprising the terminal device.

25. Infrastructure equipment according to clause 22, wherein, when the warning notification message consists of a data amount of less than a predetermined data amount, the control circuitry controls the transmitter circuitry to transmit the warning notification message using communication resources of a system information block (SIB) and the second signal comprises information for the terminal device to use to determine the SIB communication resources to be used for transmission of the warning notification message.

26. Infrastructure equipment according to any one of clauses 22 to 25, comprising a storage medium storing each of the group identifiers, the group identifiers being received from a core network of the network.

27. Infrastructure equipment according to any one of clauses 22 to 25, comprising: receiver circuitry configured to receive each group identifier from a terminal device comprised within the group associated with that group identifier; and a storage medium configured to store each of the received group identifiers.

28. Infrastructure equipment according to any one of clauses 22 to 26, comprising a storage medium configured to store each of the group identifiers, wherein the transmitter circuitry is configured to transmit each group identifier to a terminal device comprised within the group associated with that group identifier.

29. Infrastructure equipment according to any one of clauses 17 to 28, wherein the terminal device is configured to perform a process based on the received warning notification message.

30. Infrastructure equipment according to according to clause 29, wherein the warning notification message comprises one of audio, image or video information and the process performed by the terminal device comprises reproduction of the audio, image or video information.

31. Infrastructure equipment according to clause 29, wherein the warning notification message comprises a control instruction for controlling a function of the terminal device and the process performed by the terminal device comprises performing the function.

32. Infrastructure equipment according to any one of clauses 17 to 31, wherein the multicast or broadcast transmission is a Multimedia Broadcast Multicast Service (MBMS) or Single-Cell Point-to-Multipoint (SC-PTM) transmission.

33. A method of operating a terminal device for use in a wireless telecommunications network, the terminal device comprising receiver circuitry, wherein the method comprises:
controlling the receiver circuitry to receive a first signal indicating that a warning notification message is to be transmitted by infrastructure equipment of the network using a multicast or broadcast transmission;
in response to the reception of the first signal, controlling the receiver circuitry to receive a second signal transmitted by infrastructure equipment of the network using predetermined communication resources, the second signal comprising information for the terminal device to use to determine communication resources for the multicast or broadcast transmission of the warning notification message;
determining the communication resources for the multicast or broadcast transmission of the warning notification message using the information comprised in the second signal;
controlling the receiver circuitry to receive the warning notification message using the determined communication resources.

34. A storage medium storing a computer program for controlling a computer to perform a method according to clause 33.

35. A method of operating infrastructure equipment for use in a wireless telecommunications network, the infrastructure equipment comprising transmitter circuitry, wherein the method comprises:
controlling the transmitter circuitry to transmit a first signal to a terminal device of the network indicating that a warning notification message is to be transmitted to the terminal device;
controlling the transmitter circuitry to transmit a second signal to the terminal device using predetermined communication resources, the second signal comprising information for the terminal device to use to determine communication resources for the multicast or broadcast transmission of the warning notification message; and
controlling the transmitter circuitry to transmit the warning notification message using the communication resources determinable by the terminal device using the information comprised in the second signal.

36. A storage medium storing a computer program for controlling a computer to perform a method according to clause 35.

37. Circuitry for a terminal device for use in a wireless telecommunications network, the circuitry comprising receiver circuitry and control circuitry, wherein the control circuitry is configured to:
control the receiver circuitry to receive a first signal indicating that a warning notification message is to be transmitted by infrastructure equipment of the network using a multicast or broadcast transmission;
in response to the reception of the first signal, control the receiver circuitry to receive a second signal transmitted by infrastructure equipment of the network using predetermined communication resources, the second signal comprising information for the terminal device to use to determine communication resources for the muiticast or broadcast transmission of the warning notification message;
determine the communication resources for the multicast or broadcast transmission of the warning notification message using the information comprised in the second signal; control the receiver circuitry to receive the warning notification message using the determined communication resources.

38. Circuitry for infrastructure equipment for use in a wireless telecommunications network, the circuitry comprising transmitter circuitry and control circuitry, wherein the control circuitry is configured to:

control the transmitter circuitry to transmit a first signal to a terminal device of the network indicating that a warning notification message is to be transmitted to the terminal device;

control the transmitter circuitry to transmit a second signal to the terminal device using predetermined communication resources, the second signal comprising information for the terminal device to use to determine communication resources for the multicast or broadcast transmission of the warning notification message; and control the transmitter circuitry to transmit the warning notification message using the communication resources determinable by the terminal device using the information comprised in the second signal.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However. It will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] LTE for UMTS: OFDMA and SC-FDMA Based Radio Access. Harris Holma and Antti Toskala, Wiley 2009, ISBN 978-0-470-99401-6.
[2] S1-172066: 3GPP TR 22.969 Feasibility Study on Enhancements of Public Warning System; Stage 1
[3] R2-1704354 3GPP TSG-RAN WG2 #98, Hangzhou, China, 15-19 May 2017, "Public Warning System in NR", Ericsson

The invention claimed is:

1. A method of operating infrastructure equipment for use in a wireless telecommunications network, the infrastructure equipment comprising transmitter circuitry, wherein the method comprises:

controlling the transmitter circuitry to transmit a first signal to a terminal device of the network indicating that a warning notification message is to be transmitted to the terminal device, the warning notification message being associated with a group identifier of the terminal device, each group identifier being for different types of terminal devices;

controlling the transmitter circuitry to transmit a second signal to the terminal device using predetermined communication resources, the second signal comprising the group identifier for the terminal device to use to determine communication resources for the multicast or broadcast transmission of the warning notification message based on the group identifier of the terminal device; and controlling the transmitter circuitry to transmit the warning notification message using the communication resources determinable by the terminal device using the information comprised in the second signal.

2. The method according to claim 1, wherein the warning notification message is one of a plurality of warning notification messages, each of the plurality of warning notification messages being associated with a respective group of one or more terminal devices and each group of one or more terminal devices being associated with a respective group identifier, the method including determining the communication resources for the multicast or broadcast transmission by the transmitter circuitry of the warning notification message based on the group identifier of the group of one or more terminal devices comprising the terminal device.

3. The method according to claim 2, wherein, when the warning notification message consists of a data amount of less than a predetermined data amount, the method includes controlling the transmitter circuitry to transmit the warning notification message using communication resources of a system information block (SIB), and the second signal comprises information for the terminal device to use to determine the SIB communication resources to be used for transmission of the warning notification message.

4. The method according to claim 2, wherein each of the plurality of warning notification messages is transmitted using communication resources associated with a different respective multicast or broadcast service, the communication resources associated with each multicast or broadcast service being scheduled based on the group identifier of the group of one or more terminal devices associated with the one of the plurality of warning notification messages transmitted using the communication resources associated with that multicast or broadcast service.

5. The method according to claim 2, wherein each of the plurality of warning notification messages is transmitted as a different respective command using communication resources associated with a single multicast or broadcast service, each command being associated with the group identifier of the group of one or more terminal devices associated with the warning notification message transmitted as that command, wherein the terminal device is configured to parse the commands received so as to determine the command associated with the group identifier of the group of one or more terminal devices comprising the terminal device.

6. The method according to claim 2, the method further comprising:

receiving each group identifier from a terminal device comprised within the group associated with that group identifier; and storing each of the received group identifiers.

7. Circuitry for a terminal device for use in a wireless telecommunications network, the circuitry comprising receiver circuitry and control circuitry, wherein the control circuitry is configured to:

control the receiver circuitry to receive a first signal indicating that a warning notification message is to be transmitted by infrastructure equipment of the network using a multicast or broadcast transmission, the warning notification message being associated with a group identifier of the terminal device, each group identifier being for different types of terminal devices;

in response to the reception of the first signal, control the receiver circuitry to receive a second signal transmitted by infrastructure equipment of the network using predetermined communication resources, the second signal comprising the group identifier for the terminal device to use to determine communication resources for the multicast or broadcast transmission of the warning notification message based on the group identifier of the terminal device;

determine the communication resources for the multicast or broadcast transmission of the warning notification message using the information comprised in the second signal;

control the receiver circuitry to receive the warning notification message using the determined communication resources.

8. Circuitry for a terminal device according to claim 7, wherein the warning notification message is one of a plurality of warning notification messages, each of the plurality of warning notification messages being associated with a respective group of one or more terminal devices and each group of one or more terminal devices being associated with a respective group identifier, and the control circuitry is configured to determine the communication resources for the multicast or broadcast transmission of the warning notification message based on the group identifier of the group of one or more terminal devices comprising the terminal device.

9. Circuitry for a terminal device according to claim 8, wherein, when one of the plurality of warning notification messages consists of a data amount of less than a predetermined data amount, the one of the plurality of warning notification messages is transmitted using communication resources of a system information block (SIB), and when the one of the plurality of warning notification messages is the warning notification message to be received by the terminal device:

the second signal comprises information for the terminal device to use to determine the SIB communication resources to be used for transmission of the warning notification message, and the control circuitry is configured to:

determine the SIB communication resources to be used for transmission of the warning notification message using the information comprised in the second signal, and control the receiver circuitry to receive the warning notification message using the determined SIB communication resources.

10. Circuitry for a terminal device according to claim 8, wherein each of the plurality of warning notification messages is transmitted using communication resources associated with a different respective multicast or broadcast service, the communication resources associated with each multicast or broadcast service being scheduled based on the group identifier of the group of one or more terminal devices associated with the one of the plurality of warning notification messages transmitted using the communication resources associated with that multicast or broadcast service.

11. Circuitry for a terminal device according to claim 8, wherein each of the plurality of warning notification messages is transmitted as a different respective command using communication resources associated with a single multicast or broadcast service, each command being associated with the group identifier of the group of one or more terminal devices associated with the warning notification message transmitted as that command, wherein the control circuitry is configured to parse the commands received by the receiver circuitry so as to determine the command associated with the group identifier of the group of one or more terminal devices comprising the terminal device.

12. Circuitry for a terminal device according to claim 8, comprising, a storage medium configured to store the group identifier of the group of one or more terminal devices comprising the terminal device, wherein the control circuitry is configured to control transmitter circuitry to transmit the stored group identifier to infrastructure equipment of the network.

13. Circuitry for a terminal device according to claim 8, comprising, a storage medium configured to store the group identifier of the group of one or more terminal devices comprising the terminal device, wherein the control circuitry is configured to control the receiver circuitry to receive the group identifier from infrastructure equipment of the network.

14. Circuitry for a terminal device according to claim 7, wherein the control circuitry is configured to perform a process based on the received warning notification message.

15. Circuitry for infrastructure equipment for use in a wireless telecommunications network, the circuitry comprising transmitter circuitry and control circuitry, wherein the control circuitry is configured to:

control the transmitter circuitry to transmit a first signal to a terminal device of the network indicating that a warning notification message is to be transmitted to the terminal device, the warning notification message being associated with a group identifier of the terminal device, each group identifier being for different types of terminal devices;

control the transmitter circuitry to transmit a second signal to the terminal device using predetermined communication resources, the second signal comprising a group identifier for the terminal device to use to determine communication resources for the multicast or broadcast transmission of the warning notification message based on the group identifier of the terminal device; and control the transmitter circuitry to transmit the warning notification message using the communication resources determinable by the terminal device using the information comprised in the second signal.

16. Circuitry for infrastructure equipment according to claim 15, wherein the warning notification message is one of a plurality of warning notification messages, each of the plurality of warning notification messages being associated with a respective group of one or more terminal devices and each group of one or more terminal devices being associated with a respective group identifier, and the control circuitry is configured to determine the communication resources for the multicast or broadcast transmission by the transmitter circuitry of the warning notification message based on the group identifier of the group of one or more terminal devices comprising the terminal device.

17. Circuitry for infrastructure equipment according to claim 16, wherein, when the warning notification message consists of a data amount of less than a predetermined data amount, the control circuitry is configured to control the transmitter circuitry to transmit the warning notification message using communication resources of a system information block (SIB), and the second signal comprises information for the terminal device to use to determine the SIB communication resources to be used for transmission of the warning notification message.

18. Circuitry for infrastructure equipment according to claim 16, wherein each of the plurality of warning notification messages is transmitted using communication resources associated with a different respective multicast or broadcast service, the communication resources associated with each multicast or broadcast service being scheduled based on the group identifier of the group of one or more terminal devices associated with the one of the plurality of warning notification messages transmitted using the communication resources associated with that multicast or broadcast service.

19. Circuitry for infrastructure equipment according to claim 16, further comprising:
   receiver circuitry configured to receive each group identifier from a terminal device comprised within the group associated with that group identifier; and
   a storage medium configured to store each of the received group identifiers.

20. Circuitry for infrastructure equipment according to claim 16, wherein each of the plurality of warning notification messages is transmitted as a different respective command using communication resources associated with a single multicast or broadcast service, each command being associated with the group identifier of the group of one or more terminal devices associated with the warning notification message transmitted as that command, wherein the terminal device is configured to parse the commands received so as to determine the command associated with the group identifier of the group of one or more terminal devices comprising the terminal device.

\* \* \* \* \*